(12) United States Patent
Schauer et al.

(10) Patent No.: US 12,330,232 B2
(45) Date of Patent: Jun. 17, 2025

(54) METHOD FOR MONITORING A LASER MACHINING PROCESS ON WORKPIECES

(71) Applicant: Precitec Gmbh & Co. KG, Gaggenau (DE)

(72) Inventors: Erich Schauer, Kuppenheim (DE); Eric Supernok, Edesheim (DE)

(73) Assignee: Precitec GmbH & Co. KG, Gaggenau (DE)

( * ) Notice: Subject to any disclaimer, the term of this patent is extended or adjusted under 35 U.S.C. 154(b) by 238 days.

(21) Appl. No.: 17/769,368

(22) PCT Filed: Oct. 6, 2020

(86) PCT No.: PCT/EP2020/077951
§ 371 (c)(1),
(2) Date: Apr. 15, 2022

(87) PCT Pub. No.: WO2021/073946
PCT Pub. Date: Apr. 22, 2021

(65) Prior Publication Data
US 2024/0131619 A1    Apr. 25, 2024
US 2024/0227069 A9    Jul. 11, 2024

(30) Foreign Application Priority Data

Oct. 16, 2019   (DE) .................... 10 2019 127 900 U (51) Int. Cl.
*B23K 26/03*      (2006.01)
*B23K 31/12*      (2006.01)

(52) U.S. Cl.
CPC .......... *B23K 26/034* (2013.01); *B23K 31/125* (2013.01)

(58) Field of Classification Search
CPC .... B23K 26/03; B23K 26/032; B23K 26/034; B23K 26/705; B23K 31/125; G07C 3/146
(Continued)

(56) References Cited

U.S. PATENT DOCUMENTS

2005/0264472 A1*  12/2005  Rast ........................ G09G 3/14
                                                                    345/30

FOREIGN PATENT DOCUMENTS

DE          4321463 A1       1/1994
DE          19962967 A1      7/2001
(Continued)

OTHER PUBLICATIONS

International Search Report dated Jan. 26, 2021; International Application No. PCT/EP2020/077951.

*Primary Examiner* — VT T Nguyen
(74) *Attorney, Agent, or Firm* — DINSMORE & SHOHL LLP (57) ABSTRACT

A method for monitoring a laser machining process for machining workpieces includes: for a plurality of machining steps, detecting a measurement signal for at least one measurement variable during a machining step; in a setting phase, defining a limit value for at least one monitoring parameter based on the measurement signals detected during the setting phase; and in a monitoring phase, determining a monitoring parameter value for each machining step based on the measurement signal, comparing the monitoring parameter value with the limit value to identify a faulty machining step, and determining whether a process change condition is met based on the measurement signal of at least one machining step. After a predefined setting time interval or number of machining steps during the setting phase, switching from the setting to monitoring phase, and switching back from the monitoring to setting phase when the process change condition is met.

15 Claims, 4 Drawing Sheets

(58) Field of Classification Search
USPC ............ 219/121.83, 121.63, 121.62, 121.64,
219/121.68, 121.69, 121.67, 121.6,
219/121.85, 121.72, 121.61, 121.73,
219/121.71, 121.78, 121.7, 121.82,
219/121.84, 121.76, 121.75, 121.74,
219/121.81, 121.65, 121.8, 121.66,
219/130.01, 121.86, 110, 121.77, 109,
219/76.1, 121.79, 121.14, 74, 124.34,
219/137 R, 76.14, 117.1, 121.13, 76.12,
219/130.21, 124.1, 383, 85.12, 121.19,
219/121.4, 91.1, 108, 125.1, 61, 78.01,
219/91.2, 121.39, 121.45, 121.46, 136,
219/83, 121.18, 121.23, 130.33, 137,
219/61.2, 617, 72, 75, 121.54, 384, 59.1,
219/68, 73, 85.13, 86.1, 86.41, 121.34,
219/121.41, 128, 130.1, 130.5, 56.1, 60,
219/64, 73.2, 81, 101, 119, 121.11, 121.2,
219/121.21, 121.22, 121.29, 121.31,
219/121.35, 121.36, 121.37, 121.44,
219/121.5, 121.56, 124.02, 125.11, 129,
219/132, 137.42, 137.71, 145.1, 148, 161,
219/162, 200, 201, 385, 405, 444.1, 50,
219/502, 509, 517, 522, 60.2, 601, 602,
219/603, 60 R, 61.4, 61.5, 61.6, 612, 62,
219/659, 67, 80, 82, 84, 85.14, 85.18,
219/85.19, 85.22, 86.32, 86.7, 86.8, 86.9,
219/87, 93, 97, 99, 121.12, 121.28, 121.3,
219/121.32, 124.4, 209, 56.22, 69.1,
219/73.21, 76.11, 86.24, 86.33
See application file for complete search history.

(56) References Cited

FOREIGN PATENT DOCUMENTS

DE     102018214063 A1    2/2019
DE     102018105592 A1    9/2019

\* cited by examiner

METHOD FOR MONITORING A LASER MACHINING PROCESS ON WORKPIECES

CROSS-REFERENCE TO RELATED APPLICATIONS

This application is the U.S. National Stage of PCT/EP2020/077951 filed on Oct. 6, 2020, which claims priority to German Patent Application 102019127900.3 filed on Oct. 16, 2019, the entire content of both are incorporated herein by reference in their entirety.

FIELD OF THE INVENTION

The present disclosure relates to a method for monitoring a laser machining process for machining workpieces. In particular, the method may comprise a method for automatically setting monitoring parameters and/or for automatically detecting process changes.

BACKGROUND OF THE INVENTION

In a laser machining system for machining a workpiece using a laser beam, the laser beam emerging from a laser light source or one end of a laser optical fiber is focused or collimated onto the workpiece to be machined using beam guiding and focusing optics. Machining may include laser cutting, soldering or welding, for example. The laser machining system may also be referred to as a "laser machining apparatus" or "apparatus" for short. The laser machining system may include a laser machining device, for example a laser machining head, such as a laser cutting head or a laser welding head. Particularly, when laser welding or soldering a workpiece, it is important to continuously monitor the welding or soldering process in order to ensure the quality of machining. This includes the detection of machining errors.

Continuous monitoring of a laser machining process is typically performed in real time while the laser machining process is being carried out and is therefore also referred to as online process monitoring or in-line process monitoring. During monitoring, measurement signals of various measurement variables of the laser machining process are acquired and assessed, such as the intensity of a process radiation or emission.

Then, an assessment is made in which the measurement signal is checked to determine whether certain error conditions or error criteria are met. If one or more measurement signals meet predefined error conditions during a machining step, which may comprise machining a workpiece or machining a part or region of the workpiece, an error is output. Depending on whether a machining error has occurred, a correspondingly machined workpiece may be marked as "good" or "good part" (i.e. suitable for further processing or sale) or as "bad" or "bad part" (i.e. scrap).

The assessment of the measurement signals is typically complex since the curve of the measurement variables depends heavily on the materials used, the laser power set, the machining speed, the degree of contamination of the workpieces and much more. Setting and adjusting the error conditions takes a lot of effort and must be carried out again if the laser machining process changes. Furthermore, the error conditions are typically set and adjusted manually.

SUMMARY OF THE INVENTION

It is therefore an object of the present invention to provide a method for monitoring a laser machining process for machining workpieces, wherein monitoring parameters are set automatically. It is also an object of the present invention to provide a method for monitoring a laser machining process for machining workpieces, wherein process changes are automatically recognized in order to readjust the monitoring parameters. It is also an object of the invention to specify a method for monitoring a laser machining process for machining workpieces, wherein interventions by operating personnel are avoided.

The object is achieved by the subject matter disclosed herein. Advantageous refinements and developments are also disclosed.

According to an aspect of the present disclosure, a method for monitoring a laser machining process for machining workpieces, in particular metallic workpieces, is specified. The method comprises the following steps: For a plurality of machining steps, a measurement signal for at least one measurement variable is detected during a machining step. In a setting phase, a limit value for at least one monitoring parameter is defined based on the measurement signals detected during the setting phase. In a monitoring phase, a value of the monitoring parameter is determined for each machining step based on the measurement signal of the machining step, the determined value of the monitoring parameter is compared with the limit value to identify a faulty machining step, and based on the measurement signal of at least one machining step it is determined whether a process change condition is met. Here, a change is made from the setting phase to the monitoring phase after a predefined (first) setting time interval or after a predefined (first) number of machining steps carried out during the setting phase, and the phase is switched from the monitoring back to the setting phase when the process change condition is met.

In other words, an evaluation of the process ("good" or "bad") is preferably not active in the setting phase. In the monitoring phase, it is determined whether a process change condition is met. When this is the case, the phase is switched back to the setting phase. Preferably, the system remains in the monitoring phase until the process change condition is met. In other words, when the process is stable (the process change condition is not met), the system preferably stays in the monitoring phase (so-called "cyclic phase"). Alternatively, in case of a stable process in which the process change condition is not met, the system may switch back to the setting phase after a predefined (second) setting time interval or after a predefined (second) number of machining steps carried out during the monitoring phase.

According to the method of the present disclosure, a laser machining process including a plurality of similar or repetitive machining steps is divided into two phases, namely a setting phase in which at least one limit value for a monitoring parameter is set and a monitoring phase in which at least one machining step is monitored based on a value of the monitoring parameter determined for this machining step. The laser machining process is only monitored during the monitoring phase. There may be a switch back and forth between the two phases according to certain criteria. A process change in the laser machining process can be automatically identified by the specified method and the phase can be automatically switched back to the setting phase in order to automatically adjust the limit values for the monitoring parameters based on the changed laser machining process.

The laser machining process may include a plurality of repetitive and/or similar and/or comparable machining steps. Machining a workpiece may include one or more machining steps. In other words, a machining step may include machining a workpiece or machining a part or region of the workpiece. In particular, a machining step may correspond to a spot weld or a weld seam. Each measurement signal in turn corresponds to a machining step. The measurement signals may include measurement values that are a real number.

At least one measurement variable may be detected during the individual machining steps both during the setting phase and during the monitoring phase. Detecting the measurement variable may include detecting a measurement signal or a measurement signal curve of the at least one measurement variable during a machining step, i.e. preferably during each machining step, or during every Nth machining step, e.g. during every second machining step or every third machining step, etc. Each measurement signal may include a plurality of measurement values, each of which is associated with a time of the respective machining step.

The at least one measurement variable may be a temperature, an intensity of laser light reflected by the workpiece, an intensity of plasma radiation generated, an intensity of light generated by the laser machining process in the visible spectral range and/or an intensity of light generated by the laser machining process in the infrared spectral range.

At least one limit value for at least one monitoring parameter is defined in the setting phase. The monitoring parameter may be based on only one measured value or on a plurality of measured values. The at least one limit value is defined or determined based on the measurement signals detected during the machining steps carried out in the setting phase for the measurement variable on which the monitoring parameter is based. The definition is made, for example, based on the curves of the detected measurement signals and suitable statistical methods, e.g. a box-plot analysis. The limit value may define a range of values. The limit value for the at least one monitoring parameter preferably includes an upper limit value and/or a lower limit value and/or a limit value range with a lower limit value and an upper limit value. The limit may be a positive real number. Defining may also be referred to as "learning" or "teaching".

In the setting phase, for example, a mean value curve for the measurement variable may be determined based on the measurement signals detected for the measurement variable during the setting phase. Furthermore, envelopes (so-called "reference curves" or "references" for short) may be determined for the measurement variable based on the mean value curve. The envelopes may include an upper envelope and a lower envelope, with the mean curve lying between the upper and lower envelopes. The mean curve and/or the envelopes may be determined using statistical methods, e.g. a box-plot analysis. The mean value curve may include mean values and/or median values of the measurement signals detected for the measurement variable during the setting phase. For example, the measurement signals detected for the measurement variable during the setting phase may be superimposed so that the measurement signals of the machining steps at the same machining times may be combined with one another.

In the setting phase, the respective limit value for the at least one monitoring parameter may be defined based on the mean value curve determined for the measurement variable and/or on the envelopes determined for the measurement variable.

In particular, the upper envelope may be defined such that it has a predefined first distance from the mean value curve, and the lower envelope may be defined such that it has a predefined second distance from the mean value curve. The absolute value of the first distance and the second distance may be the same or different.

The mean value curve and the envelopes may be defined such that they are within a specified permissible range for the respective measurement variable. The permissible range of a measurement variable may be predefined, for example by a user of the laser machining method or a laser machining system. The permissible range of a measured value may define a range for the respective measured value that a measurement signal of the measured value may not leave while a workpiece is machined by the laser machining process. However, when the measurement signal leaves the permissible range, the laser machining process may be aborted or terminated.

A switch from the setting phase to the monitoring phase may be performed either after a predefined setting time interval or after a predefined number of machined workpieces or after a predefined number of machining steps, in particular machining steps of the same type.

In the monitoring phase, the machining steps are monitored in order to identify a faulty machining step. Monitoring may be performed by determining a monitoring parameter value for each machining step carried out based on the measurement signal of said machining step. The monitoring parameter value determined is preferably compared with the corresponding defined limit value in order to identify whether the machining step carried out is faulty. A machining step may, for example, be identified as faulty when the monitoring parameter value determined exceeds the corresponding limit value. The method may also include outputting an error when a machining step is identified as faulty.

The at least one monitoring parameter may be an outlier distance, an integral, an area between the measurement signal outside the envelope and the closest envelope, an integral of the measurement signal over time, a mean square deviation of the measurement signal from the mean value curve, or an outlier frequency. The outlier distance may be defined as the (maximum) distance between a measured value of a measurement signal detected during a machining step that lies outside the envelope and the closest envelope. The integral may be an integral over time or an integral over a number of measured values of the measurement signal. The at least one monitoring parameter may also be an area enclosed by the measurement signal and a reference value. The at least one monitoring parameter may therefore relate to the mean value curve and/or the envelope. The reference value may be a predefined constant value, for example zero, or may correspond to the mean value curve. The value of the monitoring parameter may be respectively determined for one machining step.

Moreover, it is determined in the monitoring phase, based on the measurement signal from at least one machining step carried out, whether a process change condition is met. The determination as to whether a process change condition is met may be made after each machining step that has been carried out or regularly after a specific number of machining steps that have been carried out. When it is determined that the process change condition is met, the monitoring phase is switched back to the setting phase in order to redetermined the limit value for the at least one monitoring parameter and/or the mean value curve and/or the envelopes.

Determining whether a process change condition is met may be based on a measurement signal of a single measurement variable during a single machining step carried out, or based on detected measurement signals of a single measurement variable during a plurality of machining steps carried out, or based on detected measurement signals of a plurality of measurement variables during a plurality of machining steps carried out.

The process change condition may be met in particular when a predefined maximum value for an outlier frequency is exceeded. The outlier frequency may be defined as a number of measured values of a measurement signal detected during a machining step that lie outside the envelopes for the measurement signal, with respect to a total number of measured values of the measurement signal detected during the machining step. This is the case, for example, when the signal-to-noise ratio of the measurement signal changes, when a workpiece to be machined is dirty, or when a batch of the workpieces to be machined was changed. These circumstances may be referred to as "process change" and may lead to the measurement signals or the measurement signal curves of one or more measurement variables changing. For example, a mean and/or median of the measured values may change, or a variability, i.e. a statistical dispersion parameter, of the measured values may change. The predefined maximum value for the outlier frequency may be in the range of 10-100%, for example, preferably in the range of 50-90%.

The limit value of the at least one monitoring parameter may also be adjusted in the monitoring phase. The limit value may be adjusted based on the measurement signals detected for previous machining steps. In other words, the limit value may be smaller or larger or a limit value range may be narrower or wider as a function of the values of the monitoring parameter determined for previous machining steps. The adjustment may be used to react to whether the monitored laser machining process is stable or unstable.

The limit value for the at least one monitoring parameter may be adjusted cyclically, for example after a predefined number of machining steps or a predefined time interval.

The limit value for the at least one monitoring parameter may be adjusted when a predefined number of consecutive machining steps are identified as faulty or when a maximum error rate is exceeded. An error rate may be defined as a number of machining steps in which the limit value of the at least one monitoring parameter is exceeded, with respect to a given total number of machining steps. The error rate may be indicated, for example, as a percentage (i.e. with respect to 100 machining steps) or in parts per thousand (i.e. with respect to 1000 machining steps). The maximum error rate may be between 0.1% and 100%. The predefined number of consecutive faulty machining steps may be between 3 and 1000, preferably between 5 and 10.

Adjusting the limit value for the at least one monitoring parameter may include decreasing the limit value or increasing the limit value. Decreasing the limit may include decreasing an absolute value of the limit value and increasing may include increasing an absolute value of the limit value. The limit value for the at least one monitoring parameter may be adjusted based on measurement signals from a predefined number of previous machining steps. For example, the limit value for the at least one monitoring parameter may be adjusted based on the measurement signals of the measurement variable detected during the last n machining steps carried out, where n is a natural number. For example, based on the measurement signals detected during the last n machining steps carried out, a trend, a slope or a mean value or a median of the measurement variable may be calculated. The adjustment of the limit value may be, for example, a relative or an absolute adjustment of the limit value.

Adjusting may include deciding whether the laser machining process is stable or unstable. Adjusting may further include adjusting the limit value based on the decision. When adjusting limit values of monitoring parameters, it may therefore be taken into account whether the laser machining process is stable or unstable.

According to another aspect of the present disclosure, a laser machining system for machining a workpiece using a laser beam is provided, said laser machining system being configured to carry out the above method.

BRIEF DESCRIPTION OF THE DRAWINGS

The invention is described in detail below with reference to figures. In the figures.

DETAILED DESCRIPTION OF THE DRAWINGS

Unless otherwise noted, the same reference symbols are used below for elements that are the same or have the same effect.

Figure 1:
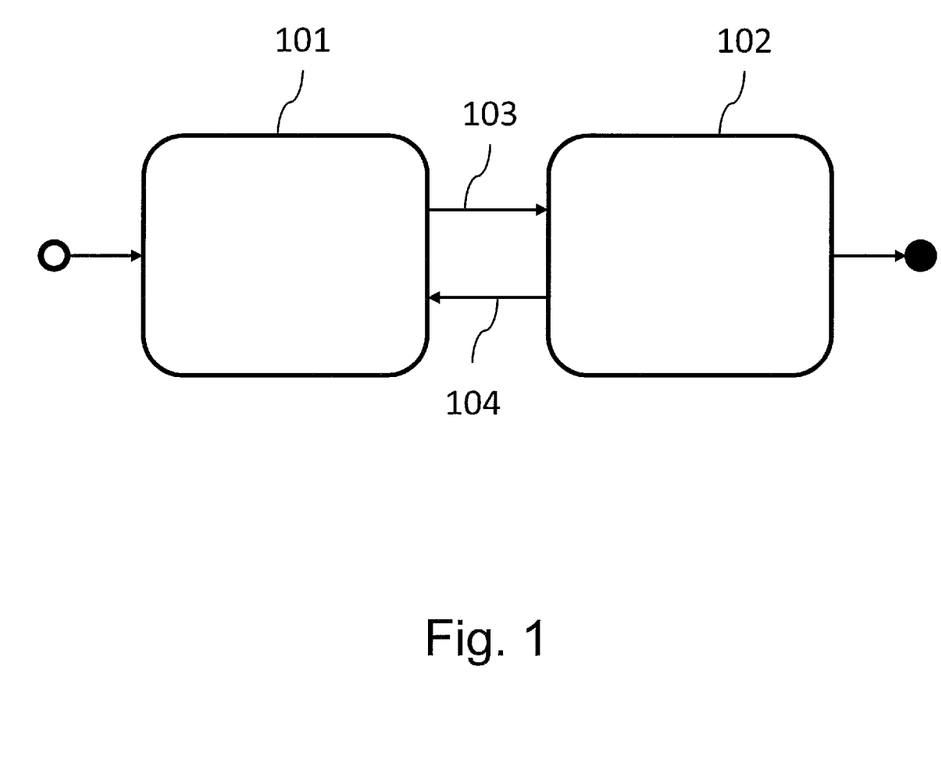
FIG. 1 shows a flowchart of a method for monitoring a laser machining process for machining workpieces according to an embodiment of the present disclosure.

FIG. 1 shows a flowchart of a method for monitoring a laser machining process according to an embodiment of the present disclosure.

The laser machining process may include a laser cutting and/or a laser welding process, for example. The method for monitoring is performed during the laser machining process. In the laser machining process, a number of repetitive machining steps are carried out consecutively. One machining step per workpiece or a plurality of machining steps per workpiece can be carried out here.

As shown in FIG. 1, the method comprises a setting phase 101 and a monitoring phase 102, the repetitive machining steps being carried out continuously both in the setting phase and in the monitoring phase. After a predefined setting interval or after a predefined number of machining steps carried out during the setting phase 101, a switch from the setting phase 101 to the monitoring phase 102 may be performed (arrow 103). A switch from the monitoring phase 102 to the setting phase 101 may be performed when a process change condition is met (arrow 104), as described below.

During each machining step, both in the setting phase 101 and in the monitoring phase 102, a signal curve or a measurement signal of at least one measurement variable is detected or recorded. The measurement variable is continuously detected or measured while workpieces are machined in order to obtain a corresponding measurement signal. The measurement signals of the measurement variables are then assessed for each machining step.

The measurement variable may be a temperature, a wavelength range of the process emissions, an intensity of a plasma radiation resulting from machining, the intensity of process emissions in the infrared spectral range of light, such as thermal radiation, the intensity of process emissions in the visible spectral range of light or the intensity of a backscattered or reflected part of the laser machining beam. The measurement signal may comprise a plurality of measuring points or measured values associated with different times of the machining step. In other words, the measurement signal is a set of these measurement values recorded over the duration of a machining step. In general, one measurement signal per measurement variable is recorded in each machining step.

Figure 2:
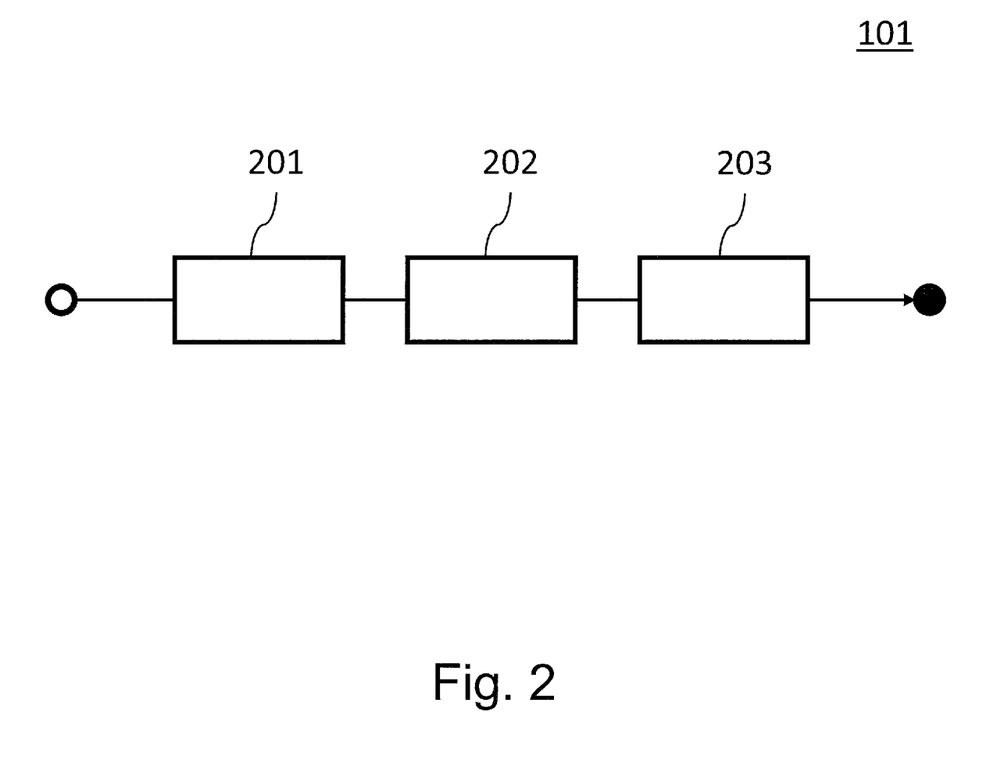
FIG. 2 shows a flowchart of a setting phase of a method according to an embodiment of the present disclosure.

FIG. 2 shows a flowchart of a setting phase of a method according to an embodiment of the present disclosure.

In FIG. 2, according to embodiments, the setting phase 101 comprises determining a mean value curve (step 201) and determining envelopes (step 202) for each measurement variable. The determination of the mean value curve is based on the measurement signals detected for the respective measurement variable during the setting phase 101 in a plurality of machining steps, as is described below with reference to FIGS. 4A and 4B. The envelopes are then determined using the mean value curve.

The method further includes, in the setting phase 101, defining a limit value for each monitoring parameter (step 203). In an example, one measurement signal may be detected for each of one or more measurement variables for each machining step carried out. One or more monitoring parameters are defined for each of these measurement variables. Based on the measurement signals detected during the setting phase 101 for a plurality of machining steps, a limit value for each monitoring parameter is defined in the setting phase 101. According to an embodiment, the respective limit value may be defined based on the mean value curve and/or based on the envelopes. When the previously defined limit value of a given monitoring parameter is exceeded during the monitoring phase, the corresponding machining step is evaluated as faulty. In the setting phase, at least no monitoring of the limit values or no process monitoring at all is carried out.

Figure 3:
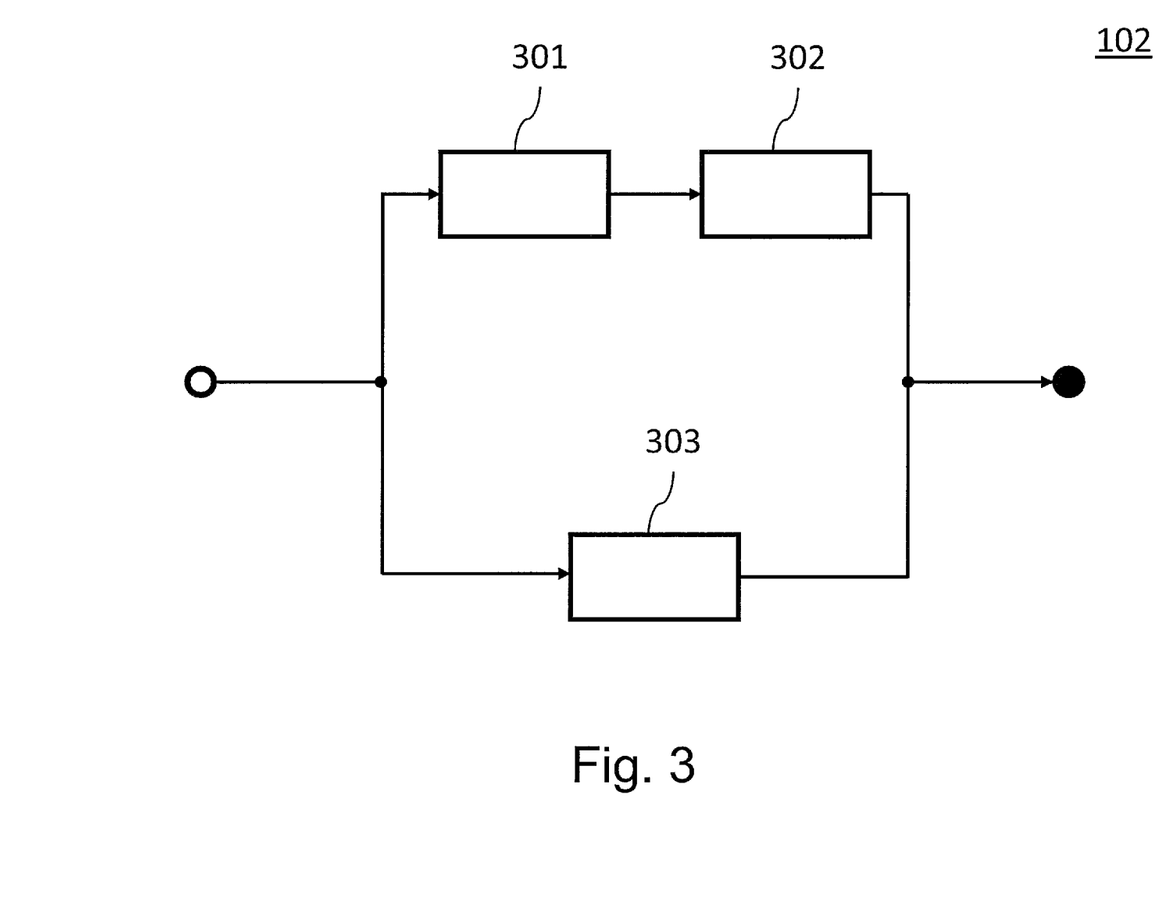
FIG. 3 shows a flowchart of a monitoring phase of a method according to an embodiment of the present disclosure.

FIG. 3 shows a flowchart of a monitoring phase 102 of a method according to an embodiment of the present disclosure. The aim of the monitoring phase is the automatic identification of changes in the welding process (process change) and the adjustment of the monitoring. Monitoring in the monitoring phase is performed in a parameterized manner using predefined monitoring parameters, each defined as a function of one or more measurement variables.

The monitoring phase 102 includes determining a value for each monitoring parameter for a machining step carried out during the monitoring phase 102 (step 301). The monitoring parameter value is determined based on the measurement signal of the at least one measurement variable which was detected during the machining step and on which the monitoring parameter is dependent. The monitoring parameter value determined for the machining step is then compared with the limit value defined for this monitoring parameter in the setting phase 101 or monitoring phase 102 (step 302). The comparison is used to identify a faulty machining step. According to an embodiment, a machining step is identified or marked as faulty when the determined monitoring parameter value exceeds the corresponding limit value. Preferably, an error is output in this case. The error may be output or displayed to a user of the laser machining process, for example, or may be stored in an error memory. In addition, the workpiece machined in the machining step may be marked as "bad" or "faulty".

In parallel to steps 301 and 302, it is determined in monitoring phase 102, based on at least one measurement signal from at least one machining step carried out during the monitoring phase, whether a process change condition is met. Determining whether a process change condition is met may be based, for example, on detected measurement signals of a single measurement variable during a plurality of machining steps carried out or based on detected measurement signals of a plurality of measurement variables during a single machining step or based on detected measurement signals of a plurality of measurement variables during a plurality of machining steps carried out.

Changes in the laser machining process, or "process changes" for short, include, for example, changes in the material of the workpieces to be machined, changes in the degree of contamination of the workpieces to be machined, adjustment of the laser power, a batch change of the workpieces to be machined, etc. This leads to a change in the measurement signals of the individual measurement variables. According to the invention, identifying a process change therefore leads to the setting phase being carried out again in order to determine at least one of the envelopes, the mean value curve and the limit values for the monitoring parameters again. The process change condition may be met, for example, when an outlier frequency exceeds a predefined value. Here, an outlier is defined as a measured value of the measurement signal that lies outside the envelopes. For example, the monitoring phase switches back to the setting phase when more than 80% of the measurement signal is outside the envelopes.

Even without process changes, a laser machining process may run with varying degrees of stability. The limit values may preferably be set or adjusted regularly depending on whether the laser machining process is going through a stable or an unstable phase. In the case of a stable laser machining process, the error conditions, in particular the limit values for the monitoring parameters, may be set narrower or stricter, whereas in the case of an unstable laser machining process, the error conditions may be set wider or more generous or more tolerant. This automatic adjustment of a limit value for a monitoring parameter may be based on the values of the monitoring parameter determined for a number of previous machining steps. For example, the limit value can be decreased when the monitoring parameter values of, e.g., the last ten machining steps were less than e.g. 80% of the limit value. The adjustment of the limit values in the monitoring phase (i.e., without adjusting the mean value curve or the envelopes) may be triggered after a predefined number of machining steps, for example after 10 machining steps. This may also be referred to as cyclical adjustment. Moreover, the adjustment of the limit values may be triggered in the monitoring phase when a specified number of subsequent errors is exceeded, i.e. a specified number of consecutive machining steps that are evaluated as faulty, or when a specified error rate is exceeded, e.g. when more than 1% of the machining steps carried out are evaluated as faulty.

Figure 4A:
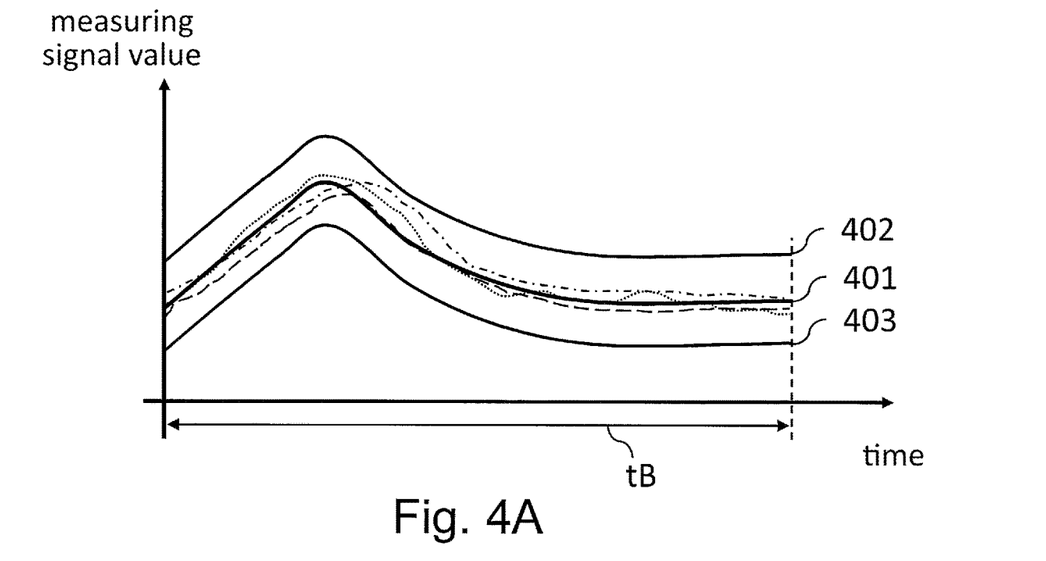
FIG. 4A is a schematic diagram of a mean curve and envelopes determined by a method according to an embodiment of the present disclosure.

FIG. 4A shows a schematic diagram of a mean value curve and envelopes determined by a method according to an embodiment of the present disclosure.

As shown in FIG. 4A, the diagram contains a number of measurement signals of a measurement variable (dashed lines) which were each detected in a machining step during the setting phase 101. The measurement signals are thus detected for similar machining steps carried out one after the other in the setting phase and are superimposed in the diagram. The duration of a machining step is marked with tB. According to an embodiment, a mean value curve 401 as well as an upper envelope 402 and a lower envelope 403 for the measurement variable are determined based on these measurement signals. According to an embodiment, the determination is based on statistical methods, for example a box-plot analysis, a mean value calculation, etc.

As shown in FIG. 4A, envelopes 402 and 403 may be at the same distance from the mean value curve 401, but are not limited thereto. As shown in FIG. 4A, the distance of the envelopes 402 was determined such that all measurement signals lie within the corridor or window formed by the upper envelope 402 and the lower envelope 403. The envelopes 402 and 403 may be defined based directly on the measurement signals for the respective measurement variable. Alternatively, the envelopes 402 and 403 are determined based on the mean value curve 401, for example the upper and lower envelopes may be determined by a deviation of +20% and −20% from the mean value curve 401, respectively.

Figure 4B:
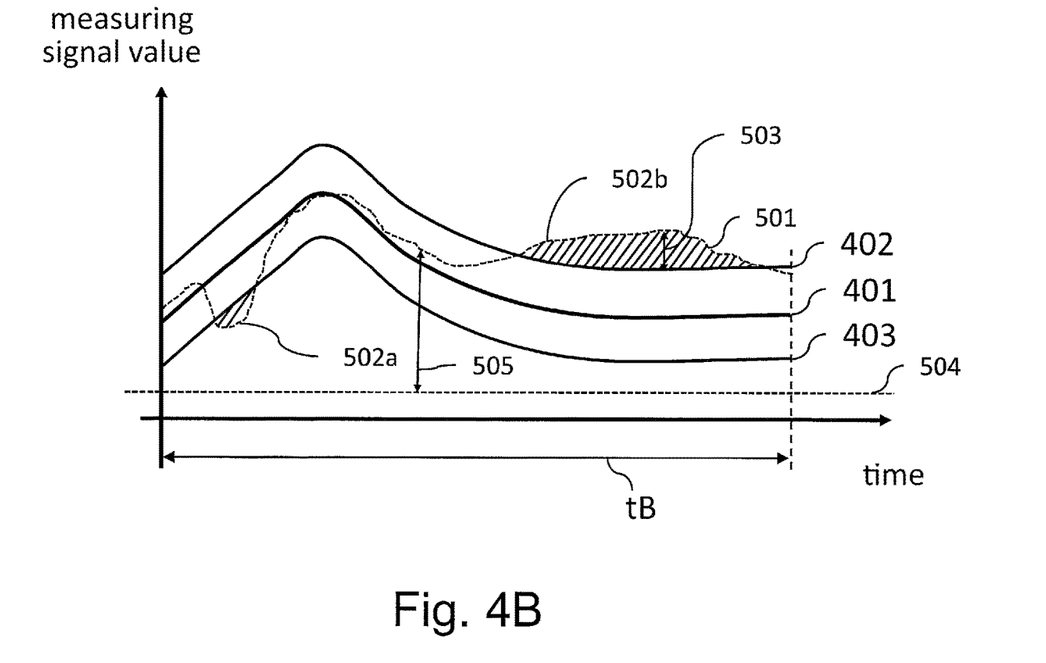
FIG. 4B shows a measurement signal for a measurement variable detected during a machining step and an illustration of monitoring parameters according to an embodiment of the present disclosure.

FIG. 4B shows a measurement signal 501 detected during a machining step in the monitoring phase for a measured value and illustrates a plurality of monitoring parameters according to an embodiment of the present disclosure. FIG. 4B also shows the mean value curve 401 and the envelopes 402 and 403 defined during the setting phase.

The monitoring parameters include, for example, an outlier distance. According to embodiments, an outlier denotes a measured value that lies outside of the envelopes 402, 403 here. The outlier distance is correspondingly defined as the distance between a measurement value of the measurement signal 501 that lies outside the envelopes 402, 403 and the closest envelope 402, 403. As shown in FIG. 4B, the measurement signal 501 has two regions 502a, 502b in which the measurement signal 501 lies outside the envelopes 402, 403, i.e. outside the window or corridor defined by the envelopes 402, 403. According to embodiments, the outlier distance may be defined as the maximum distance 503 of a measurement value of the measurement signal 501 that lies outside the envelopes 402, 403 and the closest envelope 402, 403.

The monitoring parameters can also include an area or the integral of the region 502b of the measurement signal 501 belonging to the outlier distance outside the envelopes 402, 403. The integral may be an integral over the range of the measurement signal 501 that lies outside the envelopes 402, 403 and includes the outlier measurement value. The area or the integral may be a sum of absolute values of a number of areas or an integral over regions 502a, 502b of the measurement signal 501 outside the envelopes 402, 403. In the measurement signal 501 shown in FIG. 4B, the measurement values in the regions 502a, 502b lie outside the envelopes 402, 403. An area or integral according to the above definition is associated with each of these regions 502a, 502b (hatched areas). The area or integral may also be the area or integral that corresponds to the region 502b with the maximum outlier distance 503. In the case of the measurement signal 501 shown in FIG. 4B, this corresponds to the area that is associated with the region 502b since it contains the measurement value with the maximum outlier distance 503.

The monitoring parameters may also include an integral of the measurement signal 501 over the duration tB of the machining step. The integral of the measurement signal 501 may be an integral of a distance 505 of the measurement signal 501 from a reference value 504 over time, for example. As shown in FIG. 4A, the reference value 504 may be a constant value, including but not limited to zero.

Using the disclosed method for monitoring a laser machining process for machining workpieces, monitoring parameters can be automatically reset or adjusted according to the process stability. The monitoring parameters can be automatically reset, in particular after major process changes have been identified, by switching from the monitoring phase back to the setting phase. Furthermore, limit values of monitoring parameters in the monitoring phase can be adapted to minor process changes or to changes in process stability, i.e. based on whether a machining step of the laser machining process is more stable or unstable than in previous machining steps. This eliminates the need for manual intervention and adjustment of the monitoring parameters, and the laser machining process can be carried out continuously in a sequence of a plurality of setting phases and monitoring phases.

The invention claimed is:

1. A method for monitoring a laser machining process for machining workpieces, said method comprising:
for a plurality of machining steps of the same type, detecting a measurement signal for at least one measurement variable during a machining step;
in a setting phase, defining a limit value for at least one monitoring parameter based on the measurement signals detected during the setting phase; and
in a monitoring phase, determining a monitoring parameter value for the machining step carried out in the monitoring phase based on the measurement signal of said machining step, comparing the monitoring parameter value determined with the defined limit value to identify an faulty machining step, and determining whether a process change condition is met based on the measurement signal from at least one machining step,
wherein, after a predefined setting time interval or after a predefined number of machining steps carried out during the setting phase, the phase is switched from the setting phase to the monitoring phase, and the phase is switched back from the monitoring phase to the setting phase when the process change condition is met.

2. The method according to claim 1, further comprising, in the setting phase, determining a mean value curve for the measurement variable based on the measurement signals detected for the measurement variable during the setting phase, and determining envelopes for the measurement variable based on the mean value curve,
wherein said envelopes comprise an upper envelope and a lower envelope, and said mean value curve lies between said upper envelope and said lower envelope.

3. The method according to claim 2, wherein, in the setting phase, the limit value for the at least one monitoring parameter is defined based on said mean value curve and/or based on said envelopes.

4. The method according to claim 1, wherein determining whether the process change condition is met is carried out based on a measurement signal of a single measurement variable detected in a single machining step, or based on measurement signals of a single measurement variable detected in the plurality of machining steps, or based on measurement signals of a plurality of measurement variables detected in a single machining step, or based on measurement signals of a plurality of measurement variables detected in the plurality of machining steps.

5. The method according to claim 1, wherein the process change condition is met when a predefined maximum value for an outlier frequency is exceeded, the outlier frequency being defined as a number of measurement values of a measurement signal detected during a machining step that lie outside said envelopes for the measurement signal with respect to a total number of measurement values of the measurement signal detected during the machining step.

6. The method according to claim 1, wherein the at least one monitoring parameter comprises one of:
- a maximum outlier distance, said outlier distance being defined as the maximum distance between a measurement value of a measurement signal detected during a machining step that lies outside said envelopes and the closest envelope,
- an integral over at least one region of the measurement signal of a machining step that lies outside said envelopes,
- an area between the region of the measurement signal of a machining step that lies outside said envelopes and the closest envelope,
- an integral of the measurement signal of a machining step,
- a mean square deviation of the measurement signal of a machining step from said mean value curve, and
- an outlier frequency.

7. The method according to claim 1, wherein a machining step is identified as faulty when the determined monitoring parameter value exceeds the corresponding limit value.

8. The method according to claim 1, wherein the limit value for the at least one monitoring parameter is also adjusted in the monitoring phase.

9. The method according to claim 8, wherein the limit value for the at least one monitoring parameter is adjusted cyclically, after the predefined number of machining steps or after the predefined time interval has elapsed.

10. The method according to claim 8, wherein the limit value for the at least one monitoring parameter is adjusted when a predefined number of consecutive machining steps have been identified as faulty, or when a predefined error rate is exceeded.

11. The method according to claim 8, wherein adjusting the limit value for the at least one monitoring parameter comprises decreasing the limit value or increasing the limit value.

12. The method according to claim 8, wherein the limit value for the at least one monitoring parameter is adjusted based on monitoring parameter values determined for a predefined number of preceding machining steps.

13. The method according to claim 7, further comprising outputting an error when a machining step is identified as faulty.

14. The method according to claim 1, wherein the at least one measurement variable is one of: a temperature, a thermal radiation and an intensity of at least one process emission,
  wherein the process emission comprises laser light reflected by the workpiece, plasma radiation generated by machining, light in the visible spectral range generated by machining and light in the infrared spectral range generated by machining.

15. The method according to claim 1, wherein the laser machining process is or comprises a laser welding process or a laser cutting process.

* * * * *